US011178030B2

(12) United States Patent
Kumar et al.

(10) Patent No.: US 11,178,030 B2
(45) Date of Patent: Nov. 16, 2021

(54) MOBILE INTERNET FALLBACK/SWITCHOVER AND RESTORE MECHANISM

(71) Applicant: T-Mobile USA, Inc., Bellevue, WA (US)

(72) Inventors: Vinod Kumar, Sammamish, WA (US); Dragos Dumitru Lazar, Issaquah, WA (US); Omar Hassan, Kirkland, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 40 days.

(21) Appl. No.: 15/492,791

(22) Filed: Apr. 20, 2017

(65) Prior Publication Data

US 2018/0309618 A1    Oct. 25, 2018

(51) Int. Cl.
    *H04L 12/26*     (2006.01)
    *H04L 12/54*     (2013.01)
    *H04L 29/12*     (2006.01)

(52) U.S. Cl.
    CPC ...... *H04L 43/0811* (2013.01); *H04L 12/5692* (2013.01); *H04L 43/16* (2013.01); *H04L 61/103* (2013.01); *H04L 61/6022* (2013.01)

(58) Field of Classification Search
CPC . H04L 41/0668; H04L 43/0811; H04L 43/16; H04L 45/22; H04L 61/2007; H04L 61/6022; H04L 61/103; H04L 12/5692; H04W 88/06
See application file for complete search history.

(56) References Cited

U.S. PATENT DOCUMENTS

| | | | | |
|---|---|---|---|---|
| 9,260,942 B2* | 2/2016 | Hutin | ...................... | E21B 47/12 |
| 2006/0045069 A1* | 3/2006 | Zehavi | ................ | H04L 12/5692 |
| | | | | 370/352 |
| 2008/0114529 A1* | 5/2008 | Hiruta | .................. | G08G 1/0104 |
| | | | | 701/117 |
| 2008/0219207 A1* | 9/2008 | Chen | ...................... | H04L 45/28 |
| | | | | 370/328 |
| 2010/0248707 A1* | 9/2010 | Hoffner | .................. | H04W 24/04 |
| | | | | 455/419 |
| 2013/0198298 A1* | 8/2013 | Li | ...................... | H04N 21/4307 |
| | | | | 709/206 |
| 2015/0304238 A1* | 10/2015 | Brown | .................. | H04L 47/808 |
| | | | | 370/235 |
| 2016/0099862 A1* | 4/2016 | Stellick | .................. | H04L 45/22 |
| | | | | 709/223 |
| 2016/0294830 A1* | 10/2016 | Ichikawa | ............ | H04L 61/2015 |

\* cited by examiner

*Primary Examiner* — Jianye Wu
(74) *Attorney, Agent, or Firm* — Lee & Hayes, P.C.

(57) ABSTRACT

The systems, devices, and methods discussed herein are directed to continuously providing Internet connection for user equipment (UE) connected to a router by monitoring availability of a primary data, or Internet, connection provided by a primary Internet service provider (ISP) for the router, upon determining that the primary data connection has become unavailable, switching to a secondary data, or Internet, connection established using a mobile network of a secondary ISP, and upon determining that the primary data connection has become available, switching back to the primary data connection.

20 Claims, 6 Drawing Sheets

MOBILE INTERNET FALLBACK/SWITCHOVER AND RESTORE MECHANISM

BACKGROUND

As the demand for data increases for the Internet access and usage such as websites, emails, texts, instant messages, voice over Internet Protocol (VoIP), video chat, video and music streaming, location assistance, and the like, the network traffic may become congested and users accessing the Internet may experience slow and unsatisfactory response from their devices. The users may access the Internet by connecting their devices directly or wirelessly to a router that is connected to a broadband, such as a cable or a digital subscriber line (DSL), provided by an Internet Service Provider (ISP).

If the network traffic congestions reach a certain level, some of the accessed services may time out, and some devices, currently connected or trying to connect, may be denied access to the Internet. If the ISP experiences a broadband outage, the devices connected to the Internet may be unable to recover the accessed services from the time of the outage and may lose some or all of data involved in the accessed services.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Modern telecommunication systems include heterogeneous mixtures of second, third, and fourth generation (2G, 3G, and 4G) cellular-wireless access technologies, which can be cross-compatible and can operate collectively to provide data communication services, and may also include close range technologies such as Wi-Fi™, Bluetooth™, and Zigbee™, and the like. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, LTE in Unlicensed Spectrum (LTE-U), Licensed Assisted Access (LAA), and Evolved High-Speed Packet Access (HSPA+) are examples of 4G telecommunications technologies.

The systems, devices, and methods discussed herein are directed to a mobile internet fallback/switch over mechanism for continuously providing Internet connection for a user equipment (UE) connected to a router, or a server if, or when, a primary Internet service provider (ISP) becomes unavailable. A UE may be a portable communication device, such as a cellular telephone, a tablet or laptop computer, a global positioning system (GPS) device, a game device, and the like, capable of accessing the Internet. The primary ISP, such as a cable or digital subscriber line (DSL) broadband provider, provides the primary data connection, such as Internet connection, for the router which monitors availability of the primary Internet connection. Upon determining that the primary Internet connection has become unavailable, the router switches to a secondary Internet connection using a mobile network of a secondary ISP, such as the 4G telecommunication or Wi-Fi technologies discussed above. Upon determining that the primary Internet connection has again become available, the router switches back to the primary Internet connection provided by the primary ISP.

Figure 1:
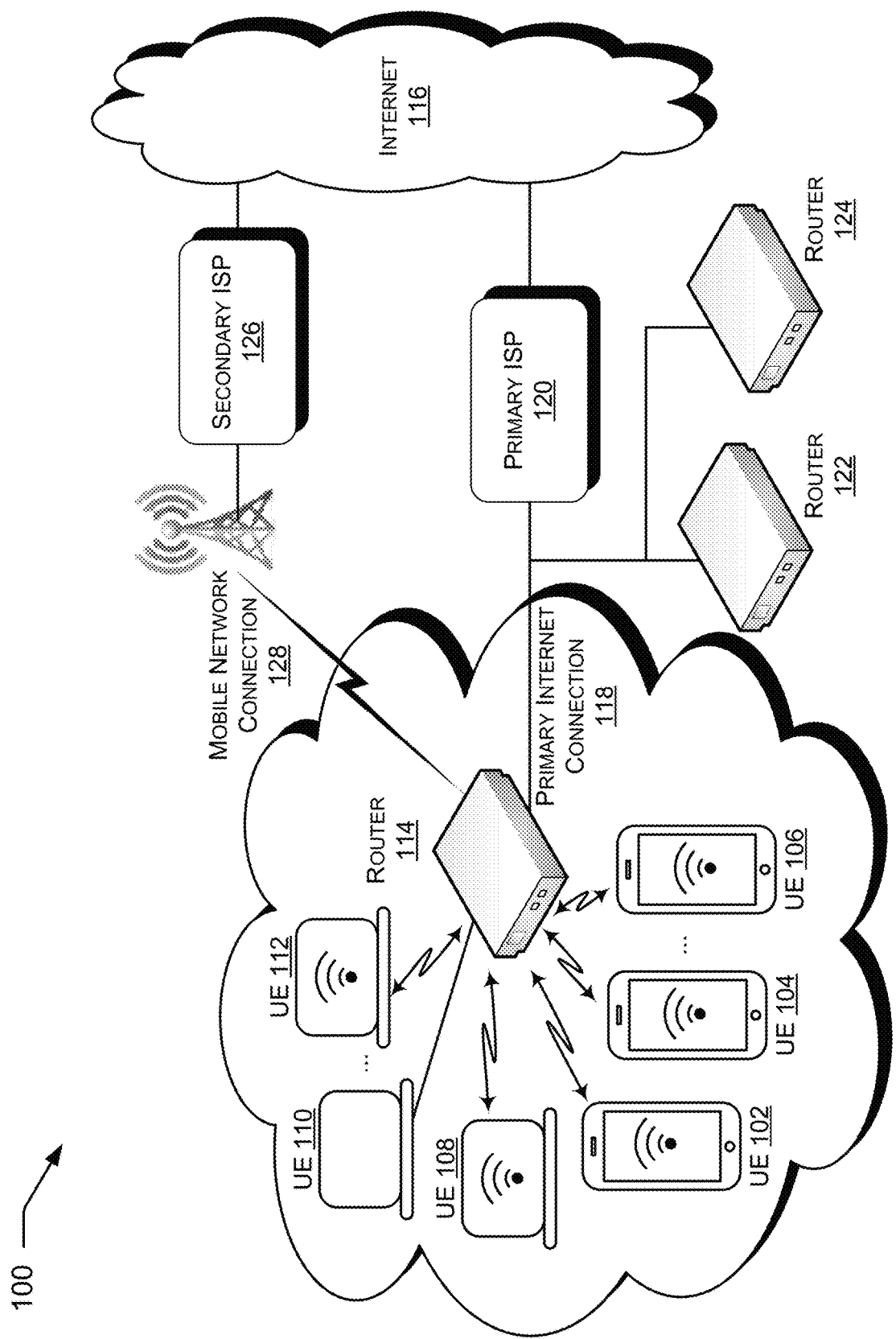
FIG. 1 illustrates an example environment in which a mobile internet fallback/switch over mechanism may be practiced.

FIG. 1 illustrates an example environment 100 in which a mobile internet fallback/switch over mechanism may be practiced.

Multiple UEs, of which six are shown, such as cellular phones UE 102, UE 104, and UE 106, and laptop computers UE 108, UE 110, UE 112, may connect to a router, such as the router 114, to access the Internet 116. The UEs may connect to the router 114 directly, for example, with a universal serial bus (USB™) cable as shown with the UE 110, or wirelessly by using any of supported wireless technologies such as the Wi-Fi or Bluetooth protocols as shown with the UE 102, UE 104, UE 106, UE 108, and UE 112. The router 114 provides Internet access to the UEs by connecting to the Internet 116 via the primary data connection, such as the primary Internet connection 118, provided by a primary ISP 120, which provides a broadband service such as a cable or DSL connection to the router 114. The primary ISP 120 may also connect to other similar routers, such as the routers 122 and 124, to provide a broadband service and the Internet access to UEs connected to the routers 122 and 124. As more UEs simultaneously access the Internet through the routers 114, 122, and 124, data traffic through the primary ISP 120 may become congested, and the some or all of UEs, connected to the routers 114, 122, and 124, may experience delays in data exchange. If the delays become significant enough, some of services UEs are currently accessing may time out, and some of data may be lost. To avoid such data traffic congestions and delays, the router 114 may also be wirelessly connected to a secondary ISP 126 via a mobile network connection 128 as a secondary data, or Internet, connection. The mobile network connection 128 may be provided by a 4G telecommunication network, a wireless local area network (WLAN) using the Wi-Fi, for example a Wi-Fi hotspot, or any other telecommunication network, capable of supporting data traffic of the router 114.

When the router 114 determines that the access, or connection, to the Internet 116 through the primary ISP 120 is no longer available based on one or more factors, the router 114 may switch over its access to the Internet 116 from the primary ISP 120 to the secondary ISP 126. The one or more factors may include a level of service, or accessibility of the Internet 116, via the primary ISP 120 falling below a predetermined level, which may be evaluated based on a service degradation, such as data traffic congestions, data response delay, and a loss of service. When the router 114 detects that the level of service via the primary ISP 120 has returned to a predetermined level, the router 116 may switch back its access to the Internet 116 from the secondary ISP 126 to the primary ISP 120.

Figure 2:
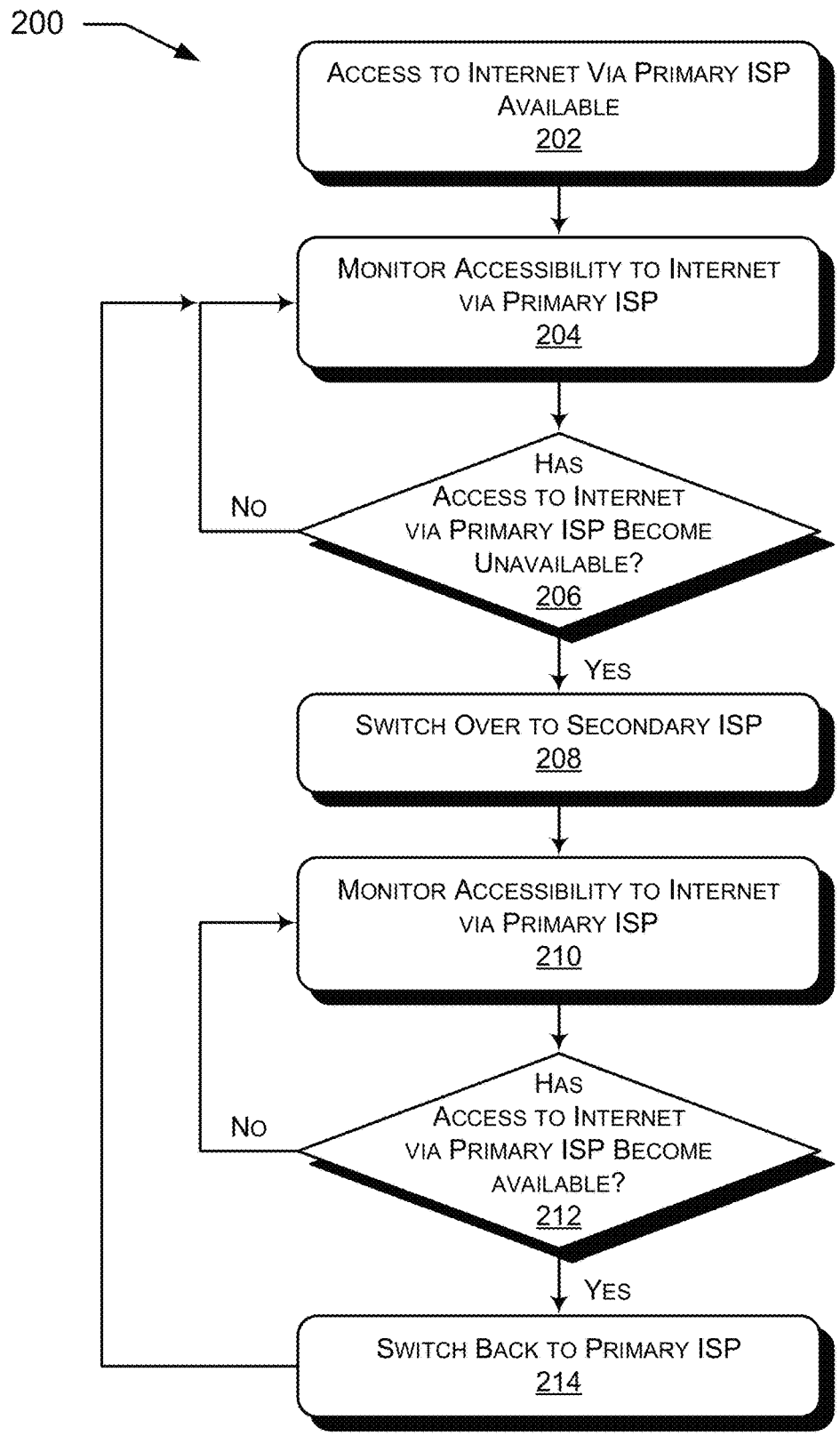
FIG. 2 illustrates an example process of the mobile internet fallback/switch over mechanism for providing continuous Internet access to UEs connected to the router.

FIG. 2 illustrates an example process 200 of the mobile internet fallback/switch over mechanism for providing continuous Internet access to UEs 102, 104, 106, 108, 110, and 112 connected to the router 114.

In block 202, the router 114 is connected to the Internet 116 via the primary ISP 120, and is able to provide the access to the Internet 116 to the UEs 102, 104, 106, 108, 110, and 112, connected to the router 114. The access, or connection, to the Internet 116 via the primary ISP 120 for the router 114 is considered to be available. The router 114 may select to stay with the primary ISP 120 based on certain criteria such as a backhaul quality estimation (BQE) or Internet connectivity detection (ICD), each of which may be evaluated at a predetermined interval. The BQE may comprise a primary ISP strength and performance, a primary ISP throughput, packet loss and retransmission, and the like, having respective threshold. The ICD may comprise a contact verification with an Internet server, such as a domain name server (not shown), of the Primary ISP 120 by ping the DNS. In block 204, the router 114 may monitor accessibility to the Internet 116 via the primary ISP 120, which may degrade due to data traffic congestions or other factors.

If the router 114 determines in block 206 that the accessibility to the Internet 116 via the primary ISP 120 has degraded enough to be considered unavailable, then the router 114, in block 208, may switch over its Internet access to the secondary ISP 126 by establishing the mobile network connection 128 as the secondary Internet connection, to connect to the secondary ISP 126. If the router 114 determines in block 206 that the accessibility to the Internet 116 via the primary ISP 120 has not degraded, then the process loops to block 204 and the router 114 may continue to monitor the accessibility to the Internet 116 via the primary ISP 120 while providing the Internet access to the UEs 102, 104, 106, 108, 110, and 112 via the primary Internet connection 118.

After the router 114 switches over its Internet access to the mobile network connection 128 provided by the secondary ISP 126 in block 208, the router 114 may continue monitoring the accessibility to the Internet 116 via the primary Internet connection 118 provided the primary ISP 120 in block 210. The router 114 may evaluate a primary data traffic throughput via the primary Internet connection 118 while providing the Internet access to the UEs 102, 104, 106, 108, 110, and 112 via the secondary Internet connection 126.

In block 212, the router 114 may determine whether the access to the Internet 116 via the primary ISP 120 has become available, or recovered sufficiently, based on the primary data traffic throughput reaching above a predetermined switch-back threshold. The primary data traffic throughput may be evaluated based on uplink/downlink traffic volume, packet length, a number of remission/retransmission and duration, a number of outstanding transmission control protocol (TCP) handshake sessions, a number of attempts by a network time protocol (NTP) task, and the like. If the router 114 determines that the primary data traffic throughput has not reached the predetermine switch-back threshold, then the router 114 may continue to connect to the Internet 116 via the secondary Internet connection of the mobile network connection 128 provided by the secondary ISP 126, and continue to monitor the accessibility to the Internet 116 via the primary ISP 118 in block 210 by evaluating the primary data traffic throughput via the primary ISP 118.

If the router 114 determines that the primary data traffic throughput has reached the predetermine switch-back threshold in block 212, then the access to the Internet 116 via the primary ISP 120 may be considered to have become available, then the router 114 may switch back the Internet access to the primary ISP 120 in block 214. The process then loops back to block 204.

Figure 3:
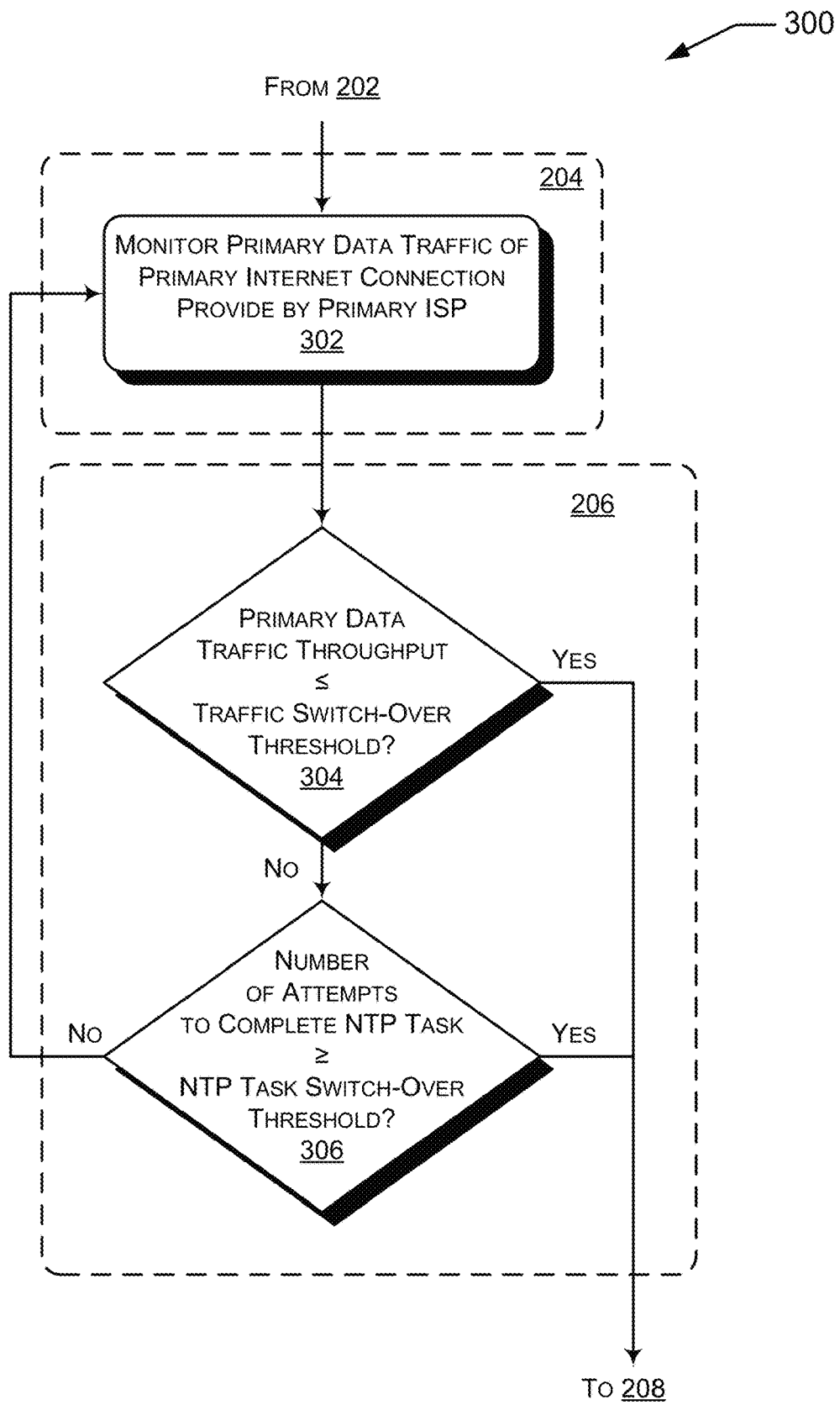
FIG. 3 illustrates an example process detailing two blocks of FIG. 2 for the router to monitor accessibility to the Internet via the primary ISP and to determine whether access to the Internet via the primary ISP has become unavailable.

FIG. 3 illustrates an example process 300 detailing blocks 204 and 206 of FIG. 2 for the router 114 to monitor accessibility to the Internet 116 via the primary ISP 120 and to determine whether access to the Internet 116 via the primary ISP 120 has become unavailable.

In block 302, the router 114 may monitor primary data traffic via the primary Internet connection 118, and consider some aspects of the primary data traffic in blocks 304 and 306 to determine whether the primary ISP 120 has become unavailable. In block 304, the router 114 may determine that the primary ISP 120 has become unavailable if the primary data traffic throughput has become less than or equal to a predetermined traffic switch-over threshold, and the process may proceed to block 208. If the router 114 determines that the primary data traffic throughput is greater than the traffic switch-over threshold in block 304, the process may loop back to block 302. Alternatively, or in addition as shown in FIG. 3, the router 114 may determine in block 306 that the primary ISP has become unavailable if the router 114 fails to complete a network time protocol (NTP) task within a predetermined number of allowed attempts, which may be set as a NTP task switch-over threshold. The process then may proceed to block 208. If the router 114 determines that the NTP task has been completed within the NTP task switch-over threshold, then the process may loop back to block 302.

Figure 4:
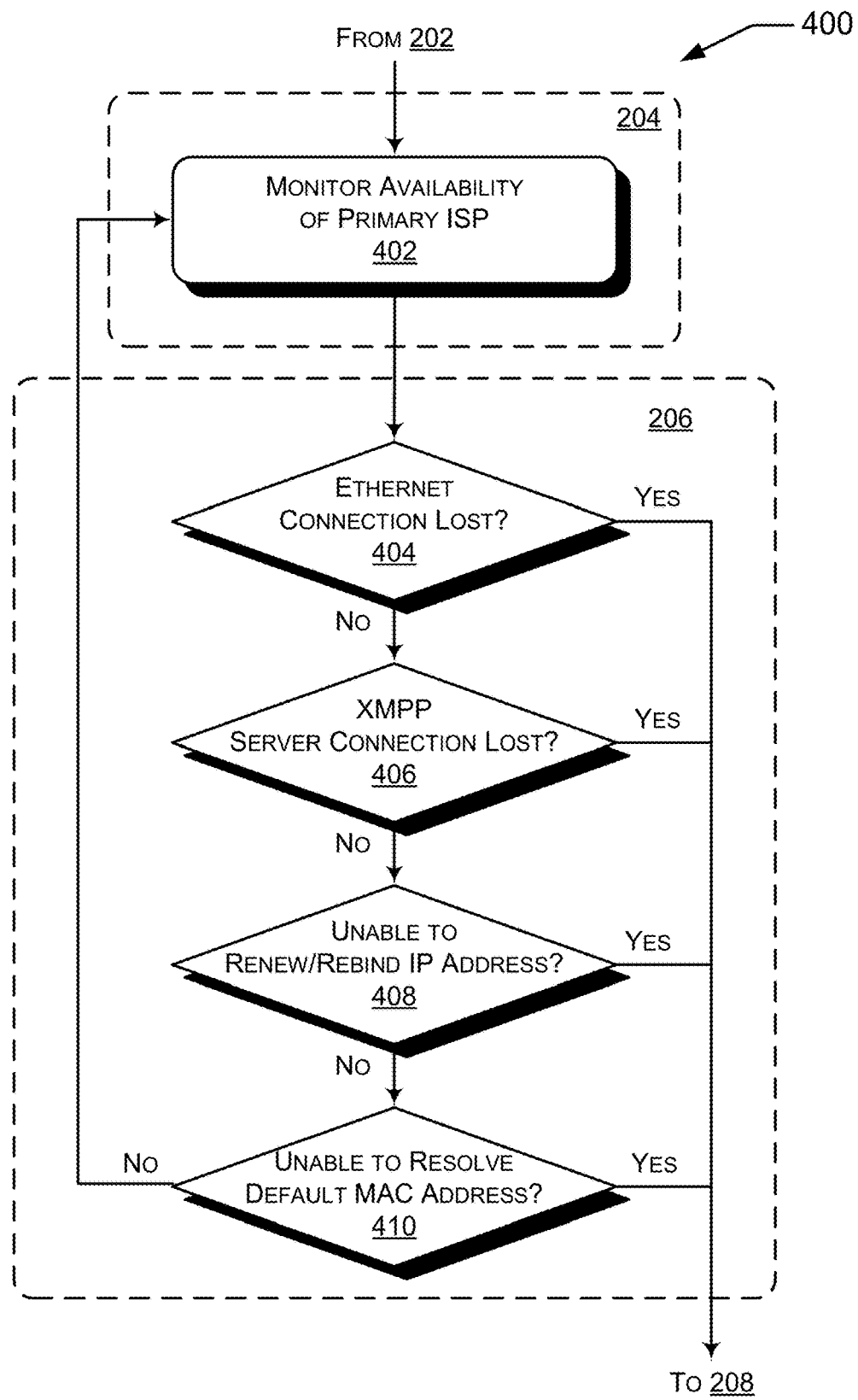
FIG. 4 illustrates another example process detailing two blocks of FIG. 2 for the router to monitor accessibility to the Internet via the primary ISP and to determine whether access to the Internet via the primary ISP has become unavailable.

FIG. 4 illustrates another example process 400 detailing blocks 204 and 206 of FIG. 2 for the router 114 to monitor accessibility to the Internet 116 via the primary ISP 120 and to determine whether access to the Internet 116 via the primary ISP 120 has become unavailable.

In block 402, the router 114 may monitor the availability of the primary ISP 120. The router 114 may consider several factors to determine that the primary ISP 120 has become unavailable. In block 404, the router 114 may determine that the Ethernet connection from the primary ISP 120 has been lost, and the process may proceed to block 208. If the Ethernet connection is still available, the router 114 may next determine if an extensible messaging and presence protocol (XMPP) server connection has been lost in block 406. If the router 114 determines that the XMPP server connection has been lost in block 406, the process may proceed to block 208. If the XMPP server connection is still available, the router 114 may next determine if it is able to renew or rebind an Internet protocol (IP) address in block 408. If the router 114 is unable to renew or rebind the IP address, the process may proceed to block 208. If the router 114 is still able to renew or rebind the IP address in block 408, the router 114 may determine if it is able to resolve a default media access control (MAC) address in block 410. If the router 114 is unable to resolve the default MAC address, the process may proceed to block 208. If the router 114 is able to resolve the default MAC address, then the process may loop back to block 402. Blocks 404, 406, 408, and 410 may be performed in any order or in parallel.

Figure 5:
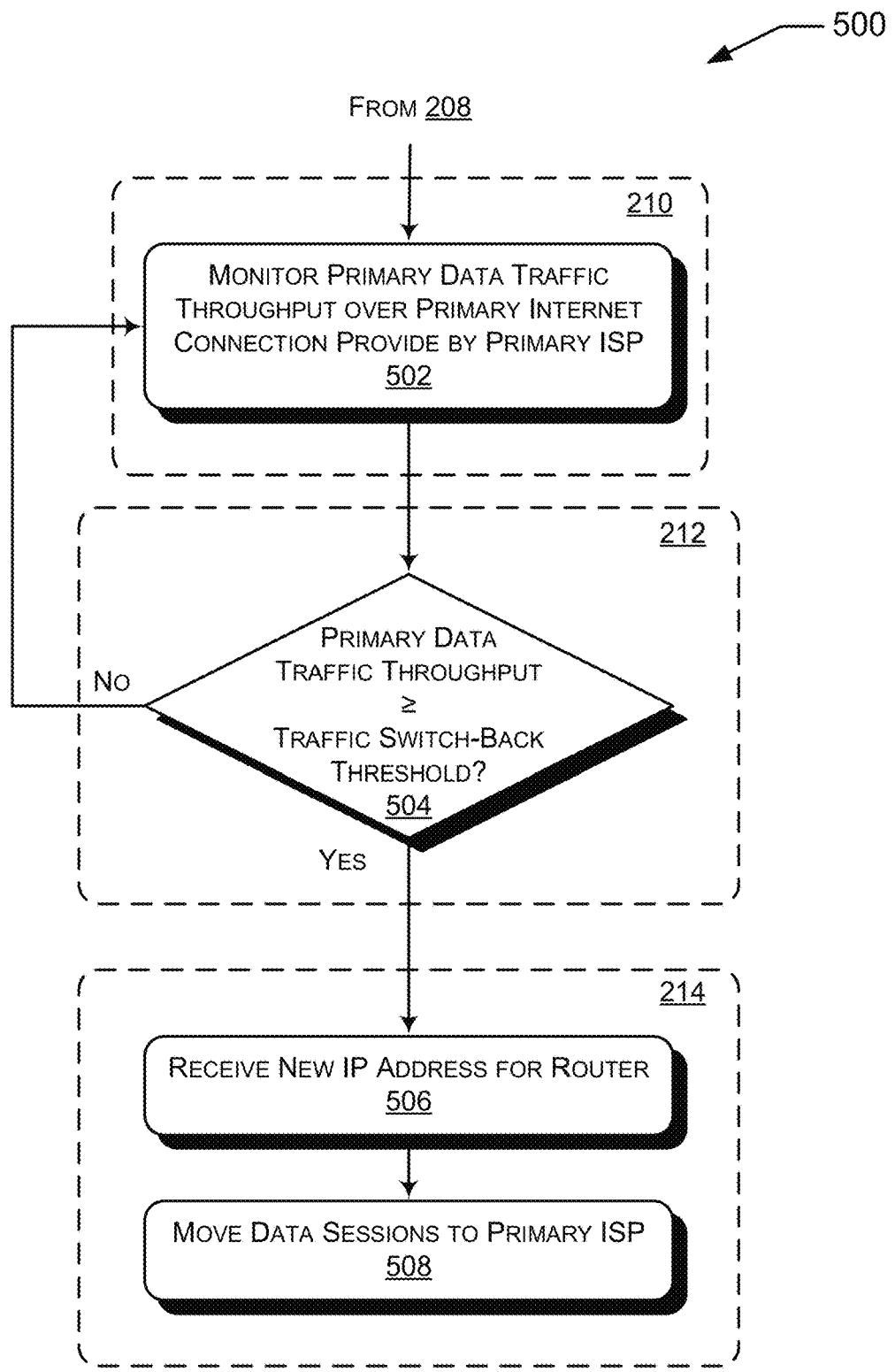
FIG. 5 illustrates an example process detailing three blocks of FIG. 2 for the router to monitor accessibility to the Internet via the primary ISP, to determine whether access to the Internet via the primary ISP has again become available, and to switch back to the primary ISP.

FIG. 5 illustrates an example process detailing three blocks 210, 212, and 214 of FIG. 2 for the router 114 to monitor accessibility to the Internet 116 via the primary ISP 120, to determine whether access to the Internet 116 via the primary ISP 120 has again become available, and to switch back to the primary ISP 120.

In block 502, the router 114 may monitor the primary data traffic throughput over the primary Internet connection 118 provided by the primary ISP 120. If router 114 determines in block 504 that the primary data traffic throughput is below a predetermined traffic switch-back threshold, the process may loop back to block 504. If the router 114 determines that the primary data traffic throughput has become greater than or equal to the predetermined traffic switch-back threshold in block 504, then the primary ISP 120 may be considered available. Then in block 506, the router 114 may receive a new IP address, and in block 508, may move data sessions to the primary ISP 126.

Some or all operations of the methods described above can be performed by execution of computer-readable instructions stored on a computer storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multi-processor systems, minicomputers, mainframe computers, personal computers, hand-held computing devices, microprocessor-based, programmable consumer electronics, combinations thereof, and the like.

The computer storage media may include volatile memory (such as random access memory (RAM)) and/or non-volatile memory (such as read-only memory (ROM), flash memory, etc.). The computer storage media may also include additional removable storage and/or non-removable storage including, but not limited to, flash memory, magnetic storage, optical storage, and/or tape storage that may provide non-volatile storage of computer-readable instructions, data structures, program modules, and the like.

The computer storage medium is an example of computer-readable media. Computer-readable media includes at least two types of computer-readable media, namely computer storage media and communications media. Computer storage media includes volatile and non-volatile, removable and non-removable media implemented in any process or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer storage media do not include communication media.

The computer-readable instructions stored on one or more computer storage media that, when executed by one or more processors, perform operations described above with reference to FIGS. 2-5. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Figure 6:
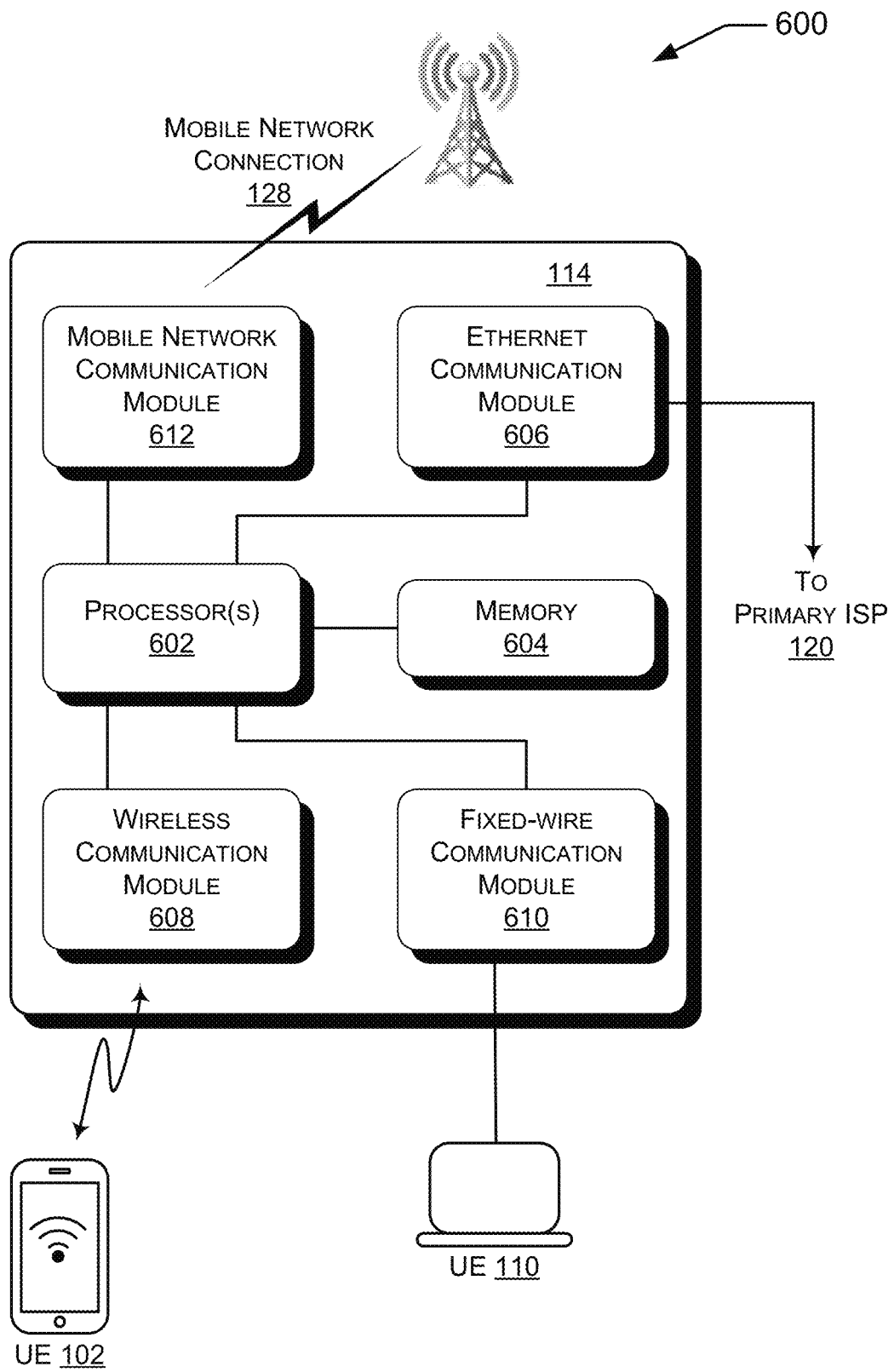
FIG. 6 illustrates an example block diagram of the router configured to provide the mobile internet fallback/switch over mechanism.

FIG. 6 illustrates an example block diagram 600 of the router 114 configured to provide the mobile internet fallback/switch over mechanism.

The router 114 may comprise one or more processors 602 and memory 604 communicatively coupled to the processors 602. The memory 604 may be a non-transitory computer storage medium and may store computer-readable instructions for performing operations described above with reference to FIGS. 2-5 when read and executed by the processors 602. The router 114 may also comprise an Ethernet communication module 606 and a wireless communication module 608, both communicatively coupled to the processors 602. The Ethernet communication module 606 may be configured to connect to the primary ISP 120, and to provide the primary Internet access for the router 114. The wireless communication module 608 may be configured to allow the UEs (only the UE 102 is shown in FIG. 6 as an example) to wirelessly connect to the router 114 using a standard protocol such as the Wi-Fi and the Bluetooth, and provide the Internet access to the UEs. The router 116 may also include a fixed-wire communication module 610 communicatively coupled to the processors 602. The fixed-fire communication module 610 may be configured to connect the UEs, such as the UE 110, by wire, to the router 114, and to provide the Internet access to the UE 110. The router 114 may further include a mobile communication module 612 communicative coupled to the processors 602. The mobile communication module 612 may be configured to establish communication with the secondary ISP 126 via the mobile network connection 128 when the Internet access via the primary ISP 120 is considered unavailable.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method in a router for continuously providing Internet connection, the method comprising:
    monitoring an availability of a primary data connection for the router, wherein:
        the availability of the primary data connection comprises an accessibility, a responsiveness, and a service of the primary data connection; and
        the primary data connection is provided by a primary network associated with a primary Internet service provider (ISP) using wired broadband; and
    routing data associated with user equipment such that the data associated with the user equipment is sent and received over the primary data connection;

determining, while data is being received via the primary data connection, that the primary data connection fails to satisfy a switch-over threshold associated with the availability of the primary data connection, wherein determining that the primary data connection fails to satisfy the switch-over threshold is based on at least an Internet connectivity detection (ICD), the ICD comprised of a contact verification with an Internet server of the primary ISP;

switching, by the router, to a secondary data connection such that the data associated with the user equipment is sent and received over the secondary data connection, the secondary data connection established using a mobile network associated with a secondary ISP, the secondary ISP being a mobile network operator (MNO);

determining that the primary data connection satisfies a switch-back threshold associated with the availability of the primary data connection; and switching, by the router and based at least on the switch-back threshold being satisfied, back to the primary data connection such that the data associated with the user equipment is sent and received over the primary data connection.

2. The method of claim 1, wherein monitoring the availability of the primary data connection for the router comprises at least one of:
monitoring primary data traffic of the router, the primary data traffic being data transmitted via the primary network; or
monitoring availability of the primary ISP.

3. The method of claim 1, wherein determining that the primary data connection fails to satisfy the switch-over threshold is further based on at least:
a backhaul quality estimation (BQE), the BQE comprising at least one of:
a primary ISP strength;
a primary ISP performance;
a primary ISP throughput; or
packet loss and retransmission associated with the primary ISP.

4. The method of claim 1, wherein the switch-over threshold further comprises at least one of:
a primary data traffic throughput threshold of the primary data connection; or
a predetermined number of attempts allowed to complete a network time protocol (NTP) task.

5. The method of claim 4, wherein determining that the primary ISP fails to satisfy the switch-over threshold further comprises at least one of:
determining that the primary data traffic throughput falls below or is equal to the switch-over threshold; or
determining that the NTP task has not been completed within the predetermined number of attempts defined by the switch-over threshold.

6. The method of claim 5, wherein determining that the primary data connection satisfies the switch-back threshold further comprises at least one of:
determining that a primary data traffic throughput is greater than or equal to the switch-back threshold, the switch-back threshold being greater than the switch-over threshold; or
completing the NTP task in fewer attempts than the switch-back threshold, the switch-back threshold being less than the switch-over threshold.

7. The method of claim 1, wherein switching back to the primary data connection comprises:

receiving a new Internet protocol (IP) address for the router; and
moving data sessions to the primary ISP.

8. A system comprising:
one or more processors;
an Ethernet communication module communicatively coupled to the one or more processors, and configured to access Internet via a primary network of a primary Internet service Provider (ISP);
a wireless communication module communicatively coupled to the one or more processors, and configured to allow user equipment (UE) to connect to the wireless communication module and access the Internet;
a mobile network communication module communicatively coupled to the one or more processors, and configured to establish a mobile network communication as a secondary data connection to access Internet via a mobile network of a secondary Internet service Provider (ISP), and
a computer storage medium coupled to the one or more processors, the computer storage medium storing one or more computer-readable instructions that, when executed, cause the one or more processors of a router to perform operations comprising:
monitoring an availability of a primary data connection for the router at the Ethernet communication module, the primary data connection provided by the primary ISP;
determining, while data is being received via the primary data connection and based at least on the availability of the primary data connection, that the primary data connection has become unavailable, the determining that the primary data connection has become unavailable being based at least in part on a predetermined number of attempts allowed to complete a network time protocol (NTP) task;
switching to the secondary data connection established via the mobile network communication module such that data associated with the user equipment is sent and received over the secondary data connection;
evaluating, based at least on the availability of the primary data connection, whether the primary data connection has become available at the Ethernet communication module; and
switching, based at least in part on the primary data connection being available, from the secondary data connection back to the primary data connection such that data associated with the user equipment is sent and received over the primary data connection.

9. The system of claim 8, wherein monitoring the availability of the primary data connection for the router at the Ethernet communication module comprises at least one of:
monitoring a primary data traffic of the router, the primary data traffic being data transmitted via the primary data connection, or
monitoring availability of the primary ISP.

10. The system of claim 9, further comprising:
determining that the primary data connection has become unavailable after the switching from the secondary data connection back to the primary data connection based at least in part on one of:
determining that an aspect of the primary data traffic is less than or equal to a switch-over threshold, or
determining that the primary ISP has become unavailable.

11. The system of claim 10, wherein the aspect of the primary data traffic comprises at least one of:

a primary data traffic throughput via the primary data connection, and the switch-over threshold is a predetermined data traffic throughput via the primary data connection, or the network time protocol (NTP) task, and the switch-over threshold is the predetermined number of attempts allowed to complete the NTP task.

12. The system of claim 10, wherein determining that the primary ISP has become unavailable after the switching from the secondary data connection back to the primary data connection is further based on:

losing an Ethernet cable connection to the router.

13. The system of claim 11, wherein determining that the primary data connection has become available comprises:

determining that the primary data traffic throughput is greater than or equal to a switch-back threshold, the switch-back threshold being greater than the switch-over threshold.

14. The system of claim 8, wherein switching back to the primary data connection comprises:

receiving a new Internet protocol (IP) address for the router;

and moving data sessions to the primary ISP.

15. A non-transitory computer storage medium configured to store computer-readable instructions by a computer, that when executed, cause the computer to perform operations comprising:

monitoring an availability of a primary data connection of a router, the primary data connection established using a primary network provided to a user equipment (UE) by a primary Internet service provider (ISP) via wired broadband;

determining, while data is being received via the primary data connection and based at least on the availability of the primary data connection, that the primary data connection has become unavailable, the determining that the primary data connection has become unavailable being based at least in part on a predetermined number of attempts allowed to complete a network time protocol (NTP) task;

switching to a secondary data connection such that data associated with the user equipment is sent and received over the second data connection, the secondary data connection established using a mobile network of a secondary ISP, the secondary ISP being a mobile network operator (MNO) associated with the router;

determining, based at least on the availability of the primary data connection, that the primary data connection has become available; and switching, based at least in part on the primary data connection being available, from the secondary data connection back to the primary data connection such that data associated with the user equipment is sent and received over the primary data connection.

16. The non-transitory computer storage medium of claim 15, wherein monitoring the availability of the primary data connection for the router comprises at least one of:

monitoring primary data traffic of the router, the primary data traffic being data transmitted via the primary data connection; or monitoring availability of the primary ISP.

17. The non-transitory computer storage medium of claim 16, the operations further comprising:

determining that the primary data connection has become unavailable after the switching from the secondary data connection back to the primary data connection based at least in part on one of:

determining that an aspect of the primary data traffic fails to satisfy a switch-over threshold; or determining that the primary ISP has become unavailable; and determining that the primary data connection has become available comprises:

determining that a primary data traffic throughput, via the primary data connection, satisfies a switch-back threshold.

18. The non-transitory computer storage medium of claim 17, wherein the aspect of the primary data traffic comprises at least one of:

a primary data traffic throughput, and wherein the switch-over threshold is a predetermined data traffic throughput via the primary data connection;

a backhaul quality estimation, and wherein the switch-over threshold comprises a predetermined threshold relating to ISP strength, performance, packet loss, and retransmission; or the network time protocol (NTP) task, and the switch-over threshold is the predetermined number of attempts allowed to complete the NTP task.

19. The non-transitory computer storage medium of claim 17, wherein determining that the primary ISP has become unavailable is based on at least one of:

losing an Ethernet cable connection to the router;

losing an extensible messaging and presence protocol (XMPP) server connection;

being unable to renew or rebind and Internet protocol (IP) address; or being unable to resolve a default gateway media access control (MAC) address.

20. The non-transitory computer storage medium of claim 17, wherein:

determining that a primary data traffic throughput, via the primary data connection, satisfies a switch-back threshold based on at least one of:

uplink traffic volume;

downlink traffic volume;

packet length;

retransmissions and an associated duration;

outstanding transmission control protocol (TCP) handshake sessions; or the number of attempts associated with the network time protocol (NTP) task; and switching, based at least in part on the primary data connection being available, from the secondary data connection back to the primary data connection comprises receiving a new Internet protocol (IP) address for the router and moving data sessions to the primary ISP.

* * * * *